United States Patent [19]

Hegar et al.

[11] 3,887,329
[45] June 3, 1975

[54] HEXAMETHYL PHOSPHOTRIAMIDE-DYE COMPOSITIONS

[75] Inventors: Gert Hegar, Schoenenbuch; Hans-Joerg Angliker, Basel; Walter Lang, Pfeffingen; Hans Wilhelm Liechti, Oberwil, Baseland; Branimir Milicevic, Riehen, all of Switzerland

[73] Assignee: Ciba-Geigy AG, Basel, Switzerland

[22] Filed: Feb. 22, 1974

[21] Appl. No.: 446,200

Related U.S. Application Data

[63] Continuation of Ser. No. 222,673, Feb. 1, 1972, abandoned, which is a continuation of Ser. No. 34,560, May 4, 1970, abandoned.

[30] Foreign Application Priority Data

May 5, 1969 Sweden.............................. 6832/69
Apr. 2, 1970 Sweden.............................. 4884/70

[52] U.S. Cl............................. 8/171; 8/1 A; 8/1 B; 8/1 D; 8/1 E; 8/1 J; 8/1 K; 8/1 L; 8/1 Q; 8/1 P; 8/25; 8/26; 8/39 R; 8/86; 8/41 R; 106/288 Q; 260/146 D; 260/146 T; 260/147; 260/148; 260/149; 260/150; 260/151

[51] Int. Cl............................................... D06p 1/38
[58] Field of Search............. 8/1 A, 39 R, 41 R, 86, 8/171, 146 D, 146 T, 147–149, 150; 106/288 Q; 260/146–151

[56] References Cited

UNITED STATES PATENTS 1,828,180  3/1958  Sertorio..................................... 8/62

FOREIGN PATENTS OR APPLICATIONS 839,420  6/1960  United Kingdom..................... 8/171
1,092,880  5/1961  Germany................................ 8/171
1,113,809  12/1959  Germany................................ 8/171
1,277,880  10/1961  France..................................... 8/171

OTHER PUBLICATIONS

Normant, Angero Chem. Internat. Edit., Vol. 6, 1967, No. 12, pp. 1046–1066.
Mullins, Acetate Silk & It's Dyes, p. 323, VanNostrand & Co., Inc., 1967

*Primary Examiner*—Benjamin R. Padgett
*Assistant Examiner*—P. A. Nelson
*Attorney, Agent, or Firm*—Joseph G. Kolodny; Edward McC. Roberts; Prabodh I. Almaula

[57] ABSTRACT

A dyestuff preparation which consists essentially of (a) a dyestuff, (b) a solvent which is hexamethylphosphotriamide and (c) optionally, a dispersing agent, (d) optionally, a further textile auxiliary agent and (e) optionally, a further solvent which is free from acidic groups.

13 Claims, No Drawings

HEXAMETHYL PHOSPHOTRIAMIDE-DYE COMPOSITIONS

This is a continuation of application Ser. No. 222,673, filed on Feb. 1, 1972, now abandoned, which is a continuation of application Ser. No. 34,560, filed May 4, 1970 (now abandoned).

At various times dyestuff preparations have been proposed which mainly consist of a solution of a dyestuff in an organic solvent. These preparations have the advantage that in contrast to the otherwise customary dyestuff powders they do not dust and that the dyestuffs contained therein do not have to be as finely ground and conditioned as is the case for dyestuff powders. Since however the admixture of the solvents necessarily increases the contamination of water and the solvents employed with the dyestuffs cannot for practical purposes be recovered, there was a need for dyestuff preparations which contain as high a proportion of dyestuff as possible.

The present invention is based on the observation that dyestuff preparations with phosphorus-containing solvents, especially with hexamethyl-phosphoric acid triamide, fulfil the above-mentioned requirement and are furthermore also substantially non-inflammable, which facilitates the handling of the preparations.

The present invention thus provides dyestuff preparations which contain (a) a dyestuff, (b) a solvent which represents a phosphorus derivative, preferably hexamethylphosphoric acid triamide, optionally (c) a dispersing agent and optionally (d) a further solvent.

It is advantageous for a dyestuff preparation according to the present invention to contain at least 20 %, preferably 25 to 50 % (relative to the weight of the dyestuff preparation) of dyestuff, it being possible for up to 50 % of the phosphorus triamide to be replaced by the dispersing agent if a liquid dispersing agent of good solvent power is utilised.

Possible dyestuffs are representatives of the most diverse classes, namely (a) substantive dyestuffs containing sulphonic acid groups, acid wool dyestuffs and especially acid fibre-reactive dyestuffs and (b) metal complex dyestuffs which must be free of sulphonic acid groups, quaternised dyestuffs, dyestuffs suitable for the spin dyeing of cellulose acetate and lacquer-soluble dyestuffs, and especially dispersion dyestuffs which also display fibre-reactive groups or can be free of such groups.

The dyestuff definitions quoted above as a rule correspond to the concepts used in the Colour Index.

The dyestuffs can belong to the most diverse classes of dyestuffs, such as the classes of the monoazo, disazo and polyazo dyestuffs, anthraquinone, perinone, quinophthalone, oxazine, nitro, phthalocyanine, stilbene and methine dyestuffs, including the styryl, azamethine, polymethine and azostyryl dyestuffs.

Amongst the especially preferred series of the dispersion dyestuffs, azo dyestuffs of the monoazo and disazo series can preferably be used. As examples, there may be mentioned the dyestuffs of formula $$D - N = N - A - NR_1R_2$$

wherein D represents the radical of a diazo component, A is the radical of an optionally substituted p-arylene radical and $R_1$ and $R_2$ each represents an optionally substituted alkyl radical which may be identical or different from one another, and the dyestuffs of formula $$D - N = N - B$$

wherein D has the meaning given above and B represents the radical of an enolisable coupling component, for example, a naphthol, phenol, pyrazolone, or aminopyrazole. Further possibilities are the disazo dyestuffs, especially those which are derived from p-phenylazo-azobenzene of formula

As examples of suitable anthraquinone dyestuffs, the optionally substituted 1,4-diamino-, 1-hydroxy-4-amino- and 1,5-dihydroxy-4,8-diaminoanthraquinones may, for example, be mentioned.

The azo dyestuffs can be derived from the following diazo components $D-NH_2$: aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl 4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2,4-dinitro-6-methylsulphonylbenzene, 1-amino-2,4-dinitro-6-(2'-hydroxyethylsulphonyl)-benzene, 1-amino-2,4-dinitro-6-(2'-chlorethylsulphonyl)-benzene, 1-amino-2-methylsulphonyl-4-nitrobenzene, 1-amino-4-methylsulphonyl-2-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-amino-benzoic acid cyclohexyl ester, 1-amino-2,4-dinitro-6-chlorobenzene and especially 1-amino-2-cyano-4-nitrobenzene, and also 1-aminobenzene-2-, -3- or -4-sulphonic acid amides, such as the N-methylamide or N,N-dimethylamide or N,N-diethylamide, N,γ-isopropoxypropyl-2-amino-naphthalene-6-sulphonic acid amide, N,γ-isopropoxypropyl-1-aminobenzene-2-, -3- or -4-sulphonic acid amide, N-isopropyl-1-aminobenzene-2-, -3- or -4-sulphonic acid amide, N,γ-methoxypropyl-1-aminobenzene-2-, -3- or -4-sulphonic acid amide, N,N-bis-(β-hydroxyethyl)-1-aminobenzene-2-, -3- or -4-sulphonic acid amide, 1-amino-4-chlorobenzene-2-sulphonic acid amide and the N-substituted derivatives, 2,3- or 4-aminophenylsulphamate, 2-amino-4-, -5- or -6-methylphenylsulphamate, 2-amino-5-methoxyphenylsulphamate, 3-amino-6-chlorophenylsulphamate, 3-amino-2,6-dichlorophenylsulphamate, 4-amino-2- or -3-methoxyphenylsulphamate, N,N-dimethyl-2-aminophenylsulphamate, N,N-di-n-butyl-2-aminophenylsulphamate, N,N-dimethyl-2-amino-4-chlorophenylsulphamate, N,n-propyl-3-aminophenylsulphamate, N,N-di-n-butyl-3-aminophenylsulphamate, O-(3-aminophenyl)-N-morpholine-N-sulphonate, O-(3-aminophenyl-N-piperidinesulphonate, N-cyclohexyl-O-(3-aminophenyl)-sulphamate, N-(N-methylaniline)-O-3-(aminophenyl)-sulphonate, N,N-diethyl- 3-amino-6-methylphenylsulphamate, N-ethyleneimine-O-(4-aminophenyl)-sulphonate, N,N-dimethyl-4-aminophenylsulphamate, O-(n-propyl)-O-(3-aminophenyl)-sulphonate, O,β-chloroethyl-O-(2-aminophenyl)-sulphonate, O-benzyl-O-(3-aminophenyl)-sulphonate and O-ethyl-O-(4-amino-2,6-dimethylphenyl)-sulphonate, 4-aminoazobenzene, 3,2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-chlor-4-aminoazobenzene, 2'- or 3'-chlor-4-aminoazobenzene, 3-nitro-4-amino-2',4'-dichloroazobenzene and 4-aminoazobenzene-4'-sulphonic acid amide, 2-aminothiazole, 2-amino-6-nitrothiazole, 2-amino-5-methylsulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl-, ethyl-, phenyl- or benzyl)-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 3-amino-5,7-dibromo-benzisothiazole, 3-amino-benzisothiazole, 3-amino-5-nitro-7-bromo-benzisothiazole, 3-amino-5-nitro-benzisothiazole, 3,5-diamino-5-nitro-benzisothiazole, 3-amino-5-chloro-benzisothiazole, 3-amino-5-chloro-7-bromobenzisthiazole, 2-amino-6-thiocyanothiazole, 2-amino-6-nitrobenzthiazole, 2-amino-6-carbethoxybenzthiazole, 2-amino-(4- or 6)-methylsulphonyl-benzthiazole, 2-amino-1,3,4-thiadiazole, 2-amino-1,3,5-thiadiazole, 2-amino-4-phenyl-or -4-methyl-1,3,5thiadiazole 2-amino-5-phenyl-1,3,4-thiadiazole, 2-amino-3-nitro-5-methylsulpho-thiophene, 2-amino-3,5-bis-(methylsulpho)-thiophene, 5-amino-3-methylisothiazole and 3- or 4-aminophthalimide.

The water-soluble azo dyestuffs may contain fibre-reactive groups, for example, s-triazinyl radicals which carry 1 or 2 chlorine or bromine atoms on the triazine ring, pyrimidyl radicals which carry one or two chlorine atoms or one or two arylsulphonyl or alkanesulphonyl groups on the pyrimidine ring, mono- or bis-(γ-halogen-β-hydroxypropyl)-amino groups, β-halogenethyl-sulphamyl radicals, β-halogenethoxy groups, β-halogenethylmercapto groups, 2-chloro-benzthiazolyl-6-azo groups, 2-chlorobenzthiazolyl-6-azo groups, 2-chlorobenzthiazolyl-6-amino groups, γ-halogen-β-hydroxy-propylsulphamyl radicals, chloracetylamino groups, α,β-dibromopropionyl groups, vinylsulphonyl groups and 2,3-epoxypropyl groups.

Suitable fibre-reactive diazo components are, for example, N,β-chlorethyl-3-chlor-4-amino-benzenesulphamide (hydrochloride), N,β-chlorethyl-4-aminobenzenesulphamide (hydrochlorode), 3-brom-4-amino-ω-chloracetophenone, N,γ-chloro-β-hydroxypropyl-4-aminobenzene-sulphamide, N,β-chlorethyl-1-amino-4-naphthylsulphonamide, N,β-chlorethyl-1-amino-3,5-dichloro-benzenesulphamide and 4-(γ-chloro-β-hydroxypropoxy)-aniline.

As coupling components H-B there may, for example, be mentioned:

N,β-cyanethyl-N-methyl-aniline, N,N-bis-(β-cyanethyl)-aniline, N-ethyl-N-(dimethylaminoethyl)-aniline, N,N-di-β-hydroxyethyl-aniline, N-ethyl-N-(β-trimethylammoniumethyl)-aniline, N-ethyl-N-(β-pyrimidiniumethyl)-aniline, 1-N-β-cyanethyl-N-ethyl-amino-3-methylbenzene, N-ethyl-N-(β,m-pyridylethyl)-aniline, 1-N-β-cyanethyl-amino-3-methylbenzene, 1-N,N-di-β-hydroxyethyl-amino-3-thiocyanatobenzene, N-β-cyanethyl-naphthsultam-(1,8), 1-N,N-di-β-cyanethyl-3-methylaminobenzene, N,β-cyanethyl-N,β-hydroxyethyl-aminobenzene, N,β-cyanethyl-2-methyl-indol, N,β-cyanethyl-tetrahydroquinoline, N-phenyl-aminobenzene, 4-hydroxy-1-methylquinoline-(2), 1-hydroxy-3-methylbenzene, 8-hydroxyquinoline, 3-cyano-2,6-dihydroxy-4-methylpyridine, 1,3-di-hydroxybenzene, 2-naphthylamine-5-sulphomethylamide, 1-hydroxy-3-cyanomethylbenzene, 1-phenyl-3-methyl-5-pyrazolone, acetoacetic esters, and anilines of the formula

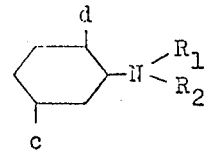

wherein c and d each represents a hydrogen atom, a lower alkyl, alkoxy or alkylmercapto radical or optionally a substituted phenyl, phenoxy or benzyl radical.

The group c can, additionally to the above-mentioned groups, also represent a chlorine or bromine atom, a trifluoromethyl group and an acylamino group which is optionally alkylated, preferably methylated, on the nitrogen atom, in which the acyl radical is the radical of an organic monocarboxylic acid, or of an organic monosulphonic acid, for example, methanemonosulphonic, ethanemonosulphonic or p-toluenemonosulphonic acid, or the radical of a carbamic acid or of a carbonic acid monoester or monoamide, for example, phenoxycarbonyl, methoxycarbonyl and aminocarbonyl.

The groups $R_1$ and $R_2$ may each represent a hydrogen atom or a lower alkyl group, that is to say, an alkyl group containing 1 to 4, preferably 2 to 4, carbon atoms, for example, methyl, ethyl, n-propyl or n-butyl groups, which can be substituted in the customary manner, for example, benzyl or β-phenylethyl groups, halogenated alkyl groups, for example, β-chlorethyl, β,β,β-trifluorethyl, β,γ-dichloropropyl or 3-chloro-2-hydroxypropyl groups, β-cyanethyl groups, alkoxyalkyl groups, for example, β-ethoxyethyl or δ-methoxybutyl groups, hydroxyalkyl groups, for example, β-hydroxyethyl or β,γ-dihydroxypropyl groups, nitroalkyl groups, for example, β-nitroethyl groups, acylaminoalkyl groups, for example, β-(acetyl- or formyl)-aminoethyl groups, fatty acid acyloxyalkyl groups, for example, formyloxyalkyl, β-acetoxyethyl, β,γ-diacetoxypropyl and γ-butyryloxypropyl groups, β-(alkyl- or aryl)-sulphonylalkyl groups, for example, β-methanesulphonylethyl, β-ethanesulphonylethyl, vinylsulphonylalkyl, phenylsulphonylalkyl and β-(p- chlorobenzenesulphonyl)-ethyl groups, alkyl- or arylcarbamoyloxyalkyl groups, for example, β-methylcarbamyloxyethyl, butylcarbamyloxyethyl and β-phenylcarbamyloxyethyl groups, alkyl- or aryloxycarbonyloxyalkyl groups, for example, β-(methoxy-, ethoxy-, β'-chlorethoxy-, isopropoxy- or p-toluyloxy)-carbonyloxyethyl groups, γ-acetamidopropyl, β-(p-nitrophenoxy)-ethyl, β-(p-hydroxyphenoxy)-ethyl, β-(β'-acetylethoxycarbonyl)-ethyl, β-[(β'-cyano-, hydroxy-, methoxy- or acetoxy)-ethoxycarbonyl]-ethyl, cyanalkoxyalkyl, β-carboxyethyl, β-acetylethyl, β-diethylaminoethyl, β-cyanacetoxyethyl, β-benzoyloxyethyl and β-(p-alkoxy- or phenoxybenzoyl)-oxyethyl groups.

The groups $R_1$ and $R_2$ in general do not contain more than 18 carbon atoms.

Azo dyestuffs to be used according to the invention are, for example, the dyestuffs of formulae:

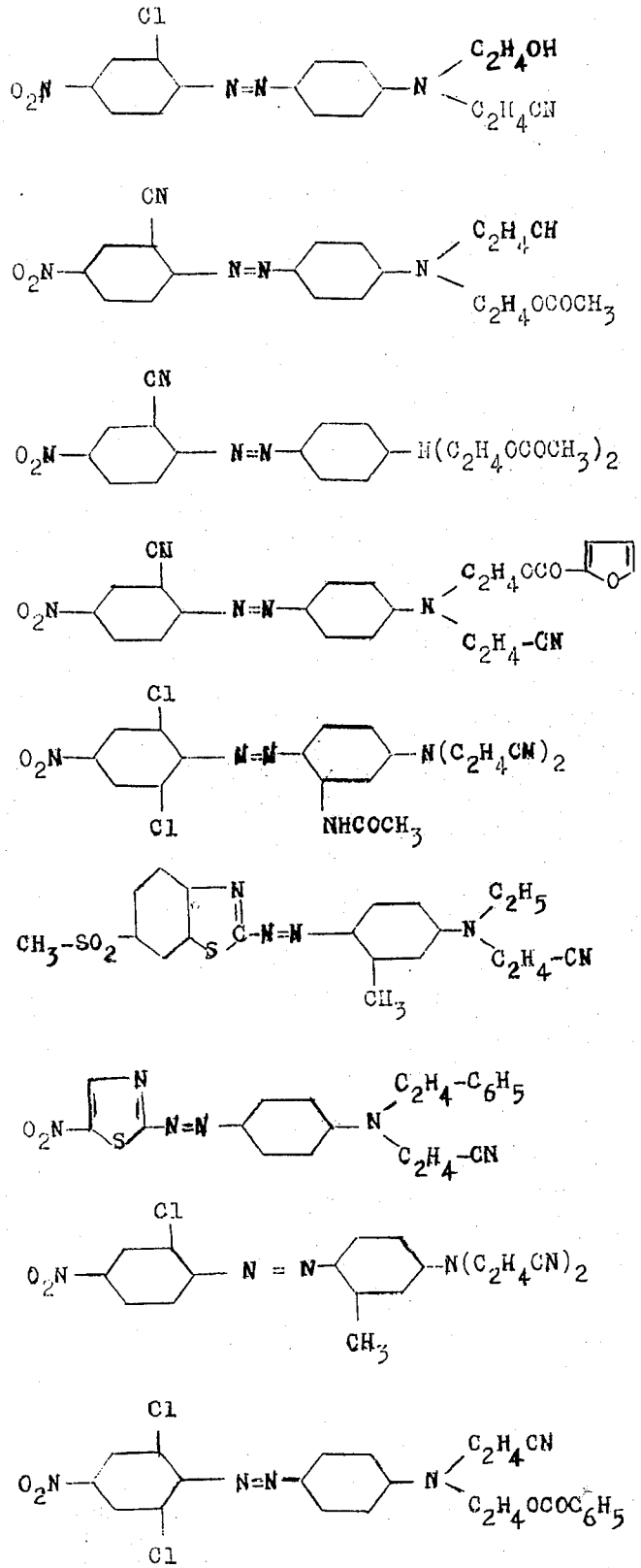

or

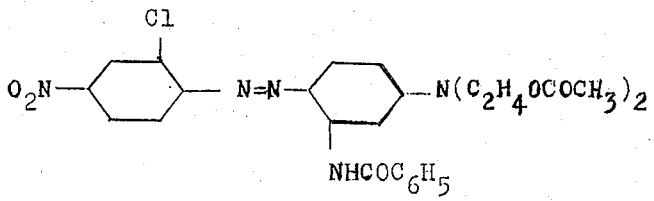

Further possibilities are dyestuffs of formulae

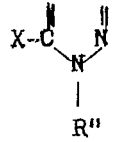 or 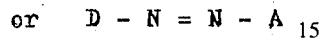

in which X = —OH or —NH$_2$, R' = H, —CH$_3$, —CONH$_2$ or —COOC$_2$H$_5$, R" = —H or —C$_6$H$_5$ and A is a phenol or naphthol radical which can be further substituted.

As examples of styryl dyestuffs which may be used according to the invention there may be mentioned those of formula

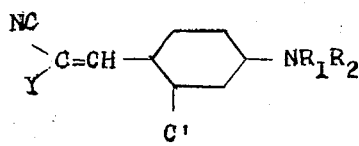

wherein R$_1$ and R$_2$ have the meanings given above, C' represents a hydrogen atom or a methyl group, and Y represents a nitrile, carbalkoxy or arylsulphonyl group, for example, a carbethoxy or phenylsulphonyl group.

The dyestuffs of the following formulae may, for example, be mentioned:

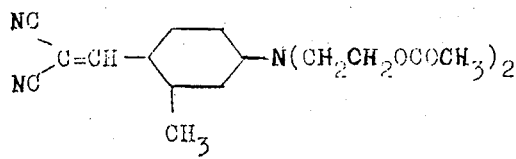

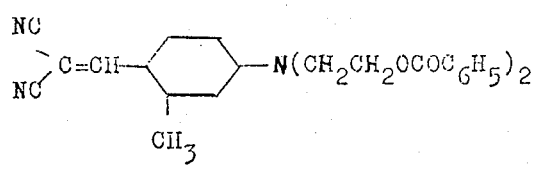

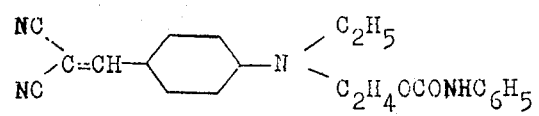

and

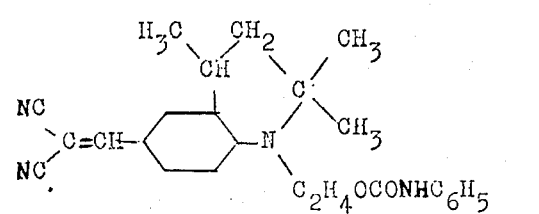

Suitable anthraquinone dyestuffs are, for example, halogenation products of 1,5-dihydroxy-4,8-diamino-anthraquinone, for example, 2- or 3-bromo-1,5-dihydroxy-4,8-diamino-anthraquinone, 3,7-dibromo-1,5-dihydroxy-4,8-diaminoanthraquinone, furthermore 1,4-diamino-2,3-dichloranthraquinone, 1,4-diamino-5-nitro-anthraquinone, 1-amino-2-phenoxy-4-hydroxy-anthraquinone, 1-amino-2-phenylmercapto-4-hydroxy-anthraquinone, 1-amino-2-(β-hydroxyethyloxy)-4-hydroxy-anthraquinone and 1-amino-2-(β-methoxyethyloxy)-4-hydroxy-anthraquinone, 1,5-dihydroxy-4,8-diamino-2- or -3-(3'-methoxy-4'-hydroxyphenyl)-anthraquinone, 1,5-dihydroxy-4,8-diamino-2- or -3-(4'-hydroxy- and/or 4'-methoxyphenyl)-anthraquinone, 1,5-dihydroxy-4,8-diamino-2- or -3-(4'-hydroxy-2'-methylphenyl)-anthraquinone, 1,5-dihydroxy-4-amino-8-acetoxyethylamino-2- or -3-(4'-hydroxyphenyl)-anthraquinone, 1,4-diamino-2,3-anthraquinone-dicarboximide, 1-hydroxy-4-amino-2,3-anthraquinone-dicarboximide, 1,8-dihydroxy-4-(p-methoxyphenylamino)-5-nitro-anthraquinone, 1-hydroxy-4-[4'-(pyrrolidon-2-yl-1)-phenylamino-anthraquinone] and p-nitro-p'-phenylaminoazobenzene.

The water-soluble reactive dyestuffs used in accordance with the invention can, for example, possess the following radicals and substituents as fibre-reactive radicals: chloromaleinylamino groups, the propiol grouping, monochlorocrotonylamino and dichlorocrotonylamino groups, bromacrylamino or chloracrylamino groups, acrylamino groups, vinylsulphone groups and especially the groupings which contain a labile substituent and which can easily be split with the bonding electron pair being taken along, for example, aliphatically bonded sulphuric acid ester or thiosulphuric acid ester groups and aliphatically bonded sulphonyl or sulphonyloxy groups or halogen atoms, especially an aliphatically bonded chlorine atom. Advantageously, these labile substituents are in the α- or β-position of an aliphatic radical which is bonded to the dyestuff molecule via an aminocarbonyl or amonosulphonyl group; in the case of the dyestuffs in question which contain halogen atoms as labile substituents, these replaceable halogen atoms can also, for example, be located in an acetyl radical or in the α- or β-position of a propionyl radical. Examples of such radicals are, for example, chloropropionylamino or α,β-dichloropropionylamino or dibromopropionylamino groups or α-chloracetylamino groups. Preferably, however, the removable halogen atoms are located in a heterocyclic radical which preferably contains 2 to 3 ring heteroatoms, especially ring nitrogen atoms, for example in a phthalazine, pyridazine, pyridazone, quinoxaline, quinazoline, oxazole or thiazole ring, but especially in a pyrimidine ring or especially in a triazine ring, for example in a grouping of formula

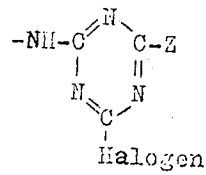

wherein Z represents a hydrogen atom, an optionally substituted amino group, an etherified hydroxyl or mercapto group or a halogen atom or an alkyl, aryl or aralkyl group. The halogen atoms are, for example, bromine atoms, but preferably chlorine atoms. Especially interesting dyestuffs are those which contain the grouping of formula

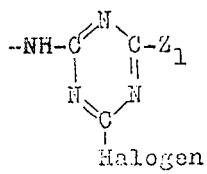

wherein $Z_1$ represents a chlorine atom, an $NH_2$ group or the radical of an aliphatic or aromatic amine, and also those fibre-reactive groups of which the removable substituent represents a quaternary ammonium or hydrazinium group which is especially bonded to a carbon atom of a heterocyclic radical, that is to say a group of formula

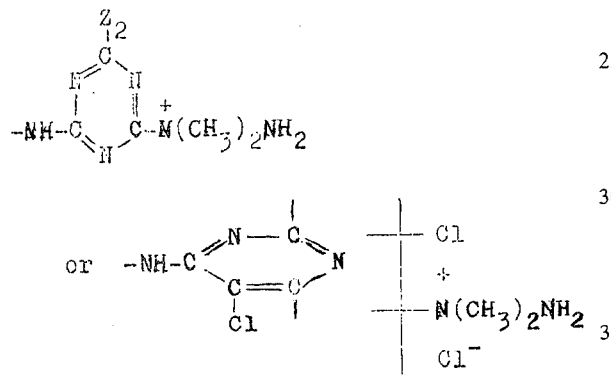

wherein $Z_2$ represents a hydrogen atom, an amino group which may be substituted or an etherified hydroxyl or mercapto group are especially interesting.

The dyestuffs to be used according to the invention are known in large numbers. They can be manufactured according to methods which are in themselves customary, for example by acylation of dyestuffs of the most diverse classes possessing primary or secondary amino groups, but especially dyestuffs of the anthraquinone, phthalocyanine or azo series, with acylating agents which contain one or more reactive groups. As such acylating agents there may, for example, be mentioned the anhydrides or chlorides of the acids corresponding to the aliphatic acylamino radicals quoted above, for example of acrylic acid, propiolic acid, chloromaleic acid, chloracrylic acid, $\alpha,\beta$-dibromopropionic acid and $\beta$-chloropropionyl acid, but especially the halides corresponding to the heterocyclic reactive radicals, that is to say, for example, the following: 2-halogenobenzthiazole- or oxazole-carboxylic or -sulphonic acid chloride, 3,6-dichloropyridazine-5-carboxylic acid chloride, tetrachloropyridazine, 4,5-dichloropyridazon-(6)-yl-propionic acid chloride, 4,5-dichloro-1-phenylpyridazone-carboxylic or -sulphonic acid chloride, 4,5-dichloropyridazonepropionic acid chloride, 1,4-dichlorophthalazine-carboxylic or -sulphonic acid chloride, 2,3-dichloroquinoxaline-carboxylic or -sulphonic acid chloride, 2,4-dichloroquinazoline-carboxylic or -sulphonic acid chloride, 2,4,6-trichloro- or 2,4,6-tribromo-pyrmidine and their derivatives which, for example, carry a nitrile, nitro, methyl, ethyl, carbamide, sulphamide, carbomethoxy, carbalkoxy, acyl (for example, benzoyl, acetyl or propionyl), alkenyl (for example, allyl or chlorovinyl) or a substituted alkyl (for example, carboxymethyl, chloromethyl or bromomethyl) group in the 5-position, 2,4,5,6-tetrachloro- or 2,4,5,6-tetrabromopyrimidine, 2,6-dichloro- or 2,6-dibromo-4-carbethoxy-primidine, 2,4,5-trichloropyrimidine, 5-nitro-6-methyl-2,4-dichloropyrimidine, 2,4-dichloropyrimidine-6-carboxylic acid chloride, 2,4-dichloropyrimidine-5-carboxylic acid chloride, 2,6-dichloro- or 2,6-dibromo-pyrimidine-4- or -5-carboxylic acid amides or -sulphonic acid amides, or -4- or -5-carboxylic acid chloride or -sulphonic acid chloride, 2,4-dichloropyrimidine-5-sulphonic acid, 2,4-dichloro-5-chloromethyl-6-methylpyrimidine, 2,4-dibromo-5-bromomethyl-6-methylpyrimidine, 2,-dichloro-5-chloromethylpyrimidine, 2,5,6-trichloro-4-bromomethylpyrimidine, 2,6-dichloro-4-trichloromethylpyrimidine or especially 2-methanesulphonyl-4,5-dichloro-6-methylpyrimidine, 2,4-dimethanesulphonyl-5-chloro-6-methylpyrimidine, 2,4,6-trichloro-1,3,5-triazine or 2,4,6-tribromo-1,3,5-triazine, and 4,6-dichloro-1,3,5-triazines, which are substituted in the 2-position by an aryl or alkyl radical, for example, a phenyl, methyl or ethyl radical, or by the radical of an aliphatic or aromatic mercapto compound bonded via the sulphur atom or hydroxyl compound bonded via the oxygen atom, or especially by a $-NH_2$ group or by the radical of an aliphatic, heterocyclic or aromatic amino compound bonded via the nitrogen atom. As such compounds, of which the radicals can be bonded to the triazine nucleus in the 2-position by reaction with trihalogenotriazines, the following may, for example, be mentioned: aliphatic or aromatic mercapto or hydroxyl compounds, for example, thioalcohols, thioglycollic acid, thiourea, thiophenols, methyl, ethyl and isopropylalcohol, glycollic acid, phenol, chlorophenols or nitrophenols, phenolcarboxylic and phenolsulphonic acids, naphthols and naphtholsulphonic acids, but especially ammonia and compounds containing amino groups which can be acylated, for example, hydroxylamine, hydrazine, phenylhydrazine, phenylhydrazinesulphonic acids, carbamic acid and its derivatives, semi- and thiosemi-carbazides and -carbazones, methylamine, ethylamine, isopropylamine, methoxyethylamine, methoxypropylamine, dimethylamine, diethylamine, methylphenylamine, ethylphenylamine, chlorethylamine, ethanolamines, propanolamines, benzylamine, cyclohexylamine, morpholine, piperidine, piperazine, aminocarbonic acid esters, aminoacetic acid ethyl ester, aminoethanesulphonic acid, N-methylaminoethanesulphonic acid, but especially aromatic amines, for example, aniline, N-methylaniline, toluidines, xylidines, chloranilines, p- or m-aminoacetanilide, nitranilines, aminophenols, nitrotoluidines, phenylenediamines, toluylenediamines, anisidine, phenetidine, diphenylamine, naphthylamine, aminonaphthols, diaminonaphthalenes and especially anilines containing acid groups, for example, sulphanilic, metanilic and orthanilic acid, anilinedisulphonic acid, aminobenzylsulphonic acid, aniline-, $\omega$-methanesulphonic acid, aminodibenzoic acid, naphthylamine-monosulphonic, -disulphonic and -trisulphonic acids, aminobenzoic acids, for example, 1- or 2-hydroxy-5-aminobenzoic acid, aminonaphthol-monosulphonic, -disulphonic and -trisulphonic acids, aminobenzoic acid-sulphonic acid and the like, and also coloured compounds, or compounds possessing dyestuff character, for example, 4- nitro-4'-aminostilbenedisulphonic acid and aminoazo dyestuffs of the aminoanthraquinones or phthalocyanines, which further contain at least one reactive amino group.

The triazine radicals substituted in the 2-position by the radical of a hydroxyl, mercapto or amino compound or ammonia can appropriately also be introduced by replacing a halogen atom in the chlorotriazine dyestuff manufactured by condensation by reaction with one or several of the above-mentioned compounds.

It is furthermore possible, in the dyestuffs manufactured as indicated which contain a β-chloropropionyl, α,β-dichloropropionyl or dibromopropionyl radical, to convert these radicals subsequently in accordance with the invention, by splitting off hydrogen halide by means of agents which react alkaline, into an unsaturated acyl radical, for example, an acrylyl, a chloracrylyl or a bromacrylyl radical.

The water-soluble fibre-reactive dyestuffs which are used in accordance with the present invention, can furthermore possess the following fibre-reactive groups: 2-methylthio-4-fluoropyrimidine-5-carbonyl, 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6, 2,4-bis-(3'-carboxyphenyl-sulphonyl-1')-triazinyl-6, 2-carboxymethylsulphonyl-pyrimidinyl-4, 2-methylsulphonyl-6-methylpyrimidinyl-4, 2-methylsulphonyl-6-ethylpyrimidinyl-4, 2,6-bis-phenylsulphonyl-pyrimidinyl-6, 2,6-bis-methylsulphonyl-5-chloro-pyrimidinyl-4, 2,4-bis-methylsulphonyl-pyrimidinyl-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methylpyrimidinyl-4, 2-methylsulphonyl-5-bromo-6-methylpyrimidinyl-4, 2-methylsulphonyl-5-chlor-6-ethylpyrimidinyl-4, 2-methylsulphonyl-5-chloro-6-chloromethyl-pyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methylpyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxypyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloro-pyrimidine-4- and -5-carbonyl, 2,6-bis-(methylsulphonyl)-pyrimidine-4- or -5-carbonyl, 2-ethylsulphonyl-6-chloro-pyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl, 2-chlorobenzthiazole-5-or -6-carbonyl or -5- or -6-sulphonyl, 2-arylsulphonyl- or 2-alkylsulphonyl-benzthiazole-5- or -6-carbonyl or -5- or -6-sulphonyl, for example, 2-methylsulphonyl- or 2-ethylsulphonyl-benzthiazole-5- or -6-sulphonyl or -carbonyl, 2-phenylsulphonyl-benzthiazole-5- or -6-sulphonyl or -carbonyl and the corresponding derivatives of 2-sulphonyl-benzthiazole-5- or -6-carbonyl or -sulphonyl which contain sulpho groups on the fused benzene ring, for example, 2-chloro-benzthiazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl radicals and the N-oxide of the chloro- or 4-nitroquinoline-5-carbonyl radical. The 2,2,3,3-tetrafluorocyclobutane-carbonyl-1 or -sulphonyl-1,2-fluoro-2-chloro-3,3-difluorocyclobutane-1-carbonyl and β-(2,2,3,3-tetrafluorocyclobutyl-1)-acryloyl, α- or β-bromacryloyl and α- or β-alkyl- or -arylsulphonylacryloyl radicals may further be mentioned.

As metal complex dyestuffs, those of the dispersion series which as the heavy metal contain iron, cobalt, nickel, chromium and copper bonded as a complex are preferably used in accordance with the invention.

Possible dispersion complex dyestuffs of this nature are especially azo dyestuffs which in the nonmetallised state contain a group of formula

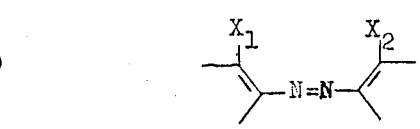

wherein $X_1$ and $X_2$ = —OH, —NH$_2$, —NH—R and —COOH.

Especially important dyestuffs are those which in the metal-free state contain atom groupings of formulae

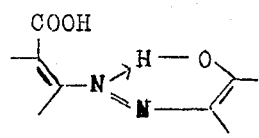

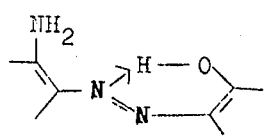

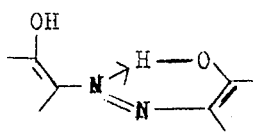

As examples, the cobalt and chromium complexes of the dyestuffs given below may be mentioned (R = —NH$_2$, —alkyl, —NH-alkyl or —N(alkyl)$_2$; the arrows indicate the direction of coupling):

 → Pyrazolone

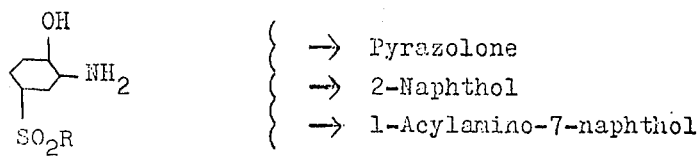
→ Pyrazolone
→ 2-Naphthol
→ 1-Acylamino-7-naphthol

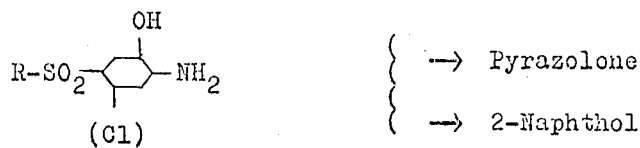
→ Pyrazolone
→ 2-Naphthol

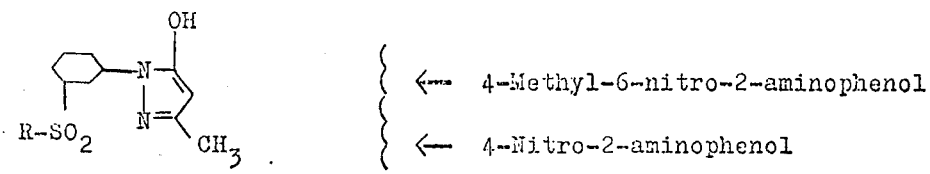
← 4-Methyl-6-nitro-2-aminophenol
← 4-Nitro-2-aminophenol

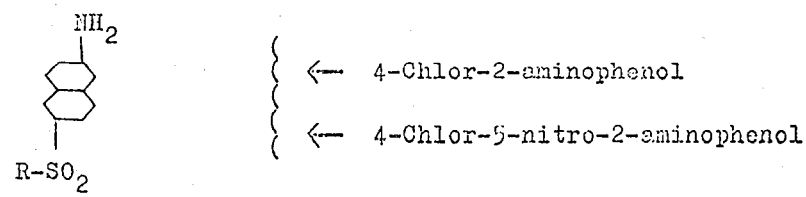
← 4-Chlor-2-aminophenol
← 4-Chlor-5-nitro-2-aminophenol

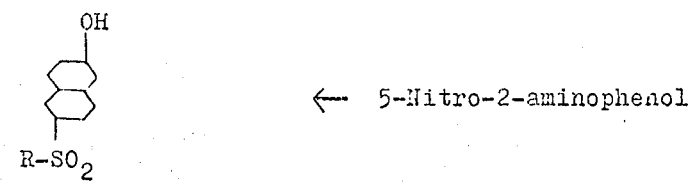
← 5-Nitro-2-aminophenol

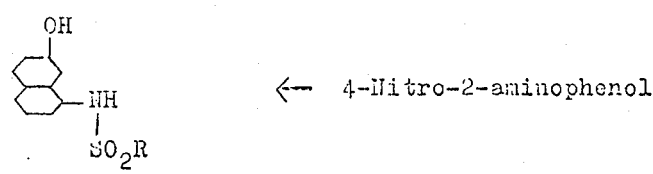
← 4-Nitro-2-aminophenol as well as the following complex dyestuffs:

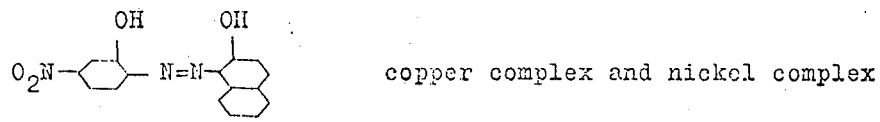 copper complex and nickel complex

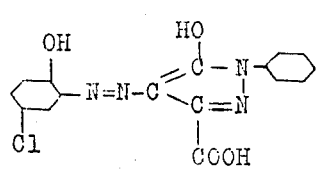

copper complex

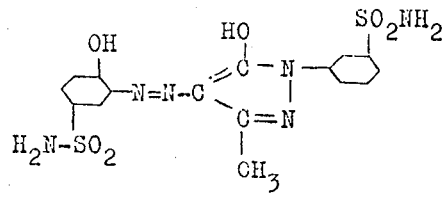

copper complex

Further possibilities are complex dyestuffs of the phthalocyanine series as well as of the 1,5-diarylformazane series which are free of sulpho groups.

The quaternised dyestuffs to be used according to the invention contain at least one quaternary nitrogen atom which can be either aliphatic or cyclic or derived from the structural type of the quinone-imine, that is to say, directly bonded to the aromatic ring.

Preferably, the customary salts and metal halide, for example, zinc chloride double salts of the known cationic dyestuffs are used, especially of the methine or azamethine dyestuffs which contain the indolinium, pyrazolium, imidazolium, triazolium, tetrazolium, oxdiazolium, thiadiazolium, oxazolium, thiazolium, pyridinium, pyrimidium or pyrazinium ring. The heterocyclic structures mentioned can be substituted and/or condensed with aromatic rings. Further possibilities are also cationic dyestuffs of the diphenylmethane, triphenylmethane, oxazine and triazine series, as well as, finally, also dyestuff salts of the arylazo and anthraquinone series having an external onium group. As examples, there may be mentioned the dyestuffs of formulae:

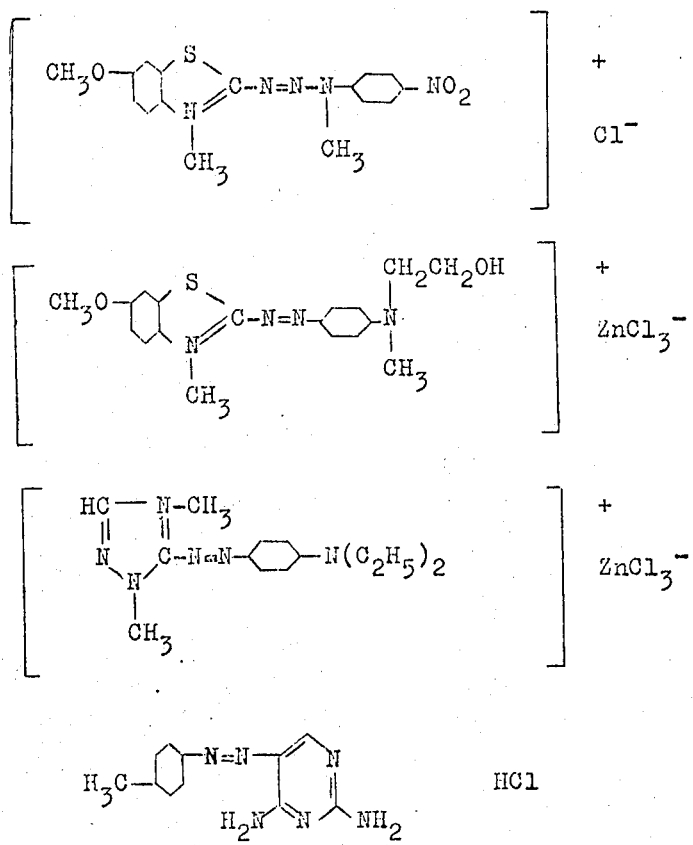

C.I. Basic Yellow 13

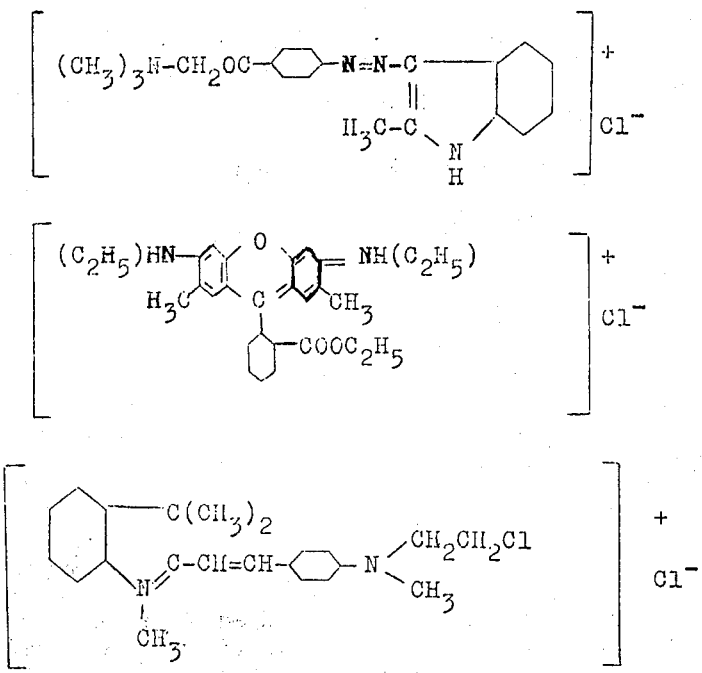

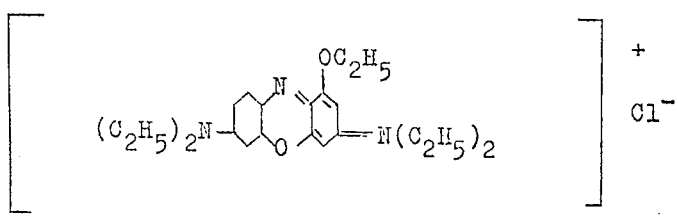
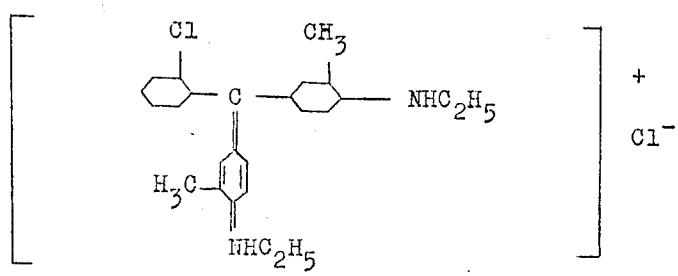
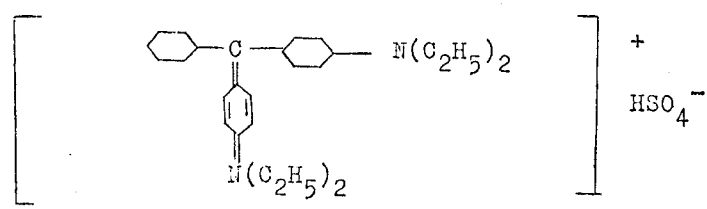
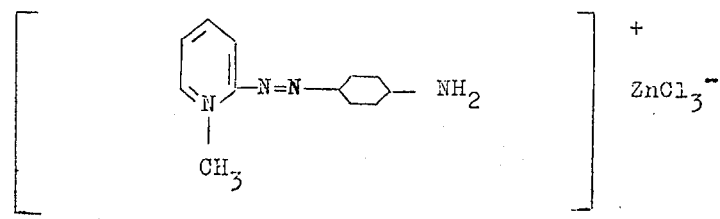
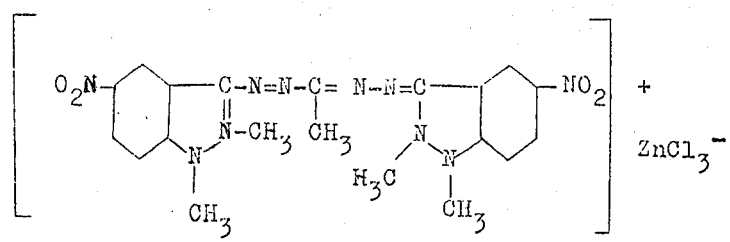
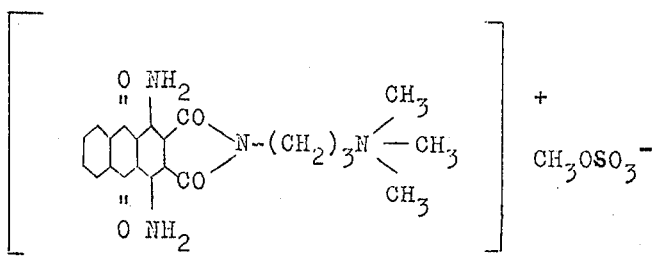
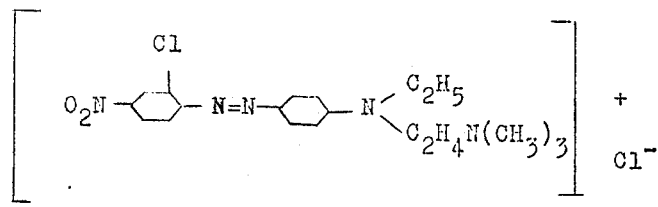

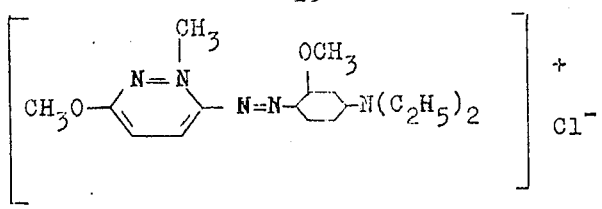

and their mixtures.

Amongst the acid substantive dyestuffs there may especially be mentioned those which are derived from benzidine, diaminostilbene and dehydrothiotoluidine as diazo components. Further important compounds are coupling products of 6-amino-1-naphthol-3-sulphonic acid as well as condensation products of two aminoazo dyestuffs with phosgene or cyanuryl chloride.

Further possibilities are also the salts of the dyestuffs containing sulphonic acid groups with aliphatic primary, secondary and tertiary amines of the fatty series, for example, dodecylamine.

Metal complex dyestuffs free of sulpho groups are mainly derived from azo dyestuffs in which there are two substituents capable of complex formation, especially hydroxyl or carboxyl groups or cyclically bonded nitrogen atoms, either in the ortho-position or in the periposition in an aromatic or hetero-aromatic radical or in the ortho-positions of two aromatic or heterocyclic radicals linked by an azo bond. The metal complexes of formazane dyestuffs in which the two groups capable of complex formation are in the ortho-positions of two aromatic or hetero-aromatic radicals bonded by a 1,2,4,5-tetrazapentamethylene chain should further be mentioned.

As optionally additionally usable solvents which can be added to the phosphorus derivative there may, for example, be mentioned the hydrophobic solvents which are immiscible with water or only of limited miscibility with water, for example, acetophenone, cyclohexanol, benzyl alcohol, esters, for example, ethyl acetate, propyl acetate and butyl acetate, hydrocarbons, for example, benzene, xylene or toluene, and halogenated hydrocarbons, for example, carbon tetrachloride, chloroform, methylene chloride, trichloroethylene, perchlorethylene, trichlorethane, tetrachlorethane, dibromethylene or chlorobenzene.

Hydrophilic solvents which are miscible with water form a particularly preferred class of solvents, examples being aliphatic alcohols, for example, methanol, ethanol, n-propanol and isopropanol, ketones, for example, acetone, methyl ethyl ketone, cyclohexanone, ethers and acetals, for example, diisopropyl-ether, diphenylene oxide, dioxan, tetrahydrofuran, glycerine-formal and glycol-formal, as well as acetonitrile and pyridine, diacetone-alcohol and also higher-boiling glycol derivatives, for example, ethylene glycol monomethyl ether, monoethyl ether and monobutyl ether and diethylene glycol monomethyl ether or monoethyl ether, thiodiglycol, polyethylene glycols, to the extent that they are liquid at room temperature, ethylene carbonate, γ-butyrolactone and especially the group of the active solvents which boil above 120°C and are miscible with water, for example, N,N-dimethylformamide, N,N-dimethylacetamide, bis-(dimethylamido)-methanephosphate, tris-(dimethylamido)-phosphate, N-methylpyrrolidone, 1,5-dimethylpyrrolidone, N,N-dimethyl-methoxy-acetamide, N,N,N',N'-tetramethylurea, tetramethylenesulphone (sulpholane) and 3-methylsulpholane and dimethylsulphoxide.

The dyestuff preparations according to the invention may contain dispersing agents. In the case of water-soluble dyestuffs the addition of dispersing agents is not necessary if the preparation is intended to be added to a dyeing liquor mainly consisting of water or containing water as a discrete phase. Equally, the use of dispersing agents can optionally be dispensed with if water-insoluble dyestuffs are to be dissolved in an organic liquor. In other cases, namely in all cases when the dyestuffs will be at least partially present in the dispersed state in the dyeing liquor, the presence of dispersing agents is indicated.

Important representatives of such dispersing agents belong especially to the following non-ionic types of compound:

a. Polyglycol compounds, for example, polyoxalkylated fatty alcohols, polyoxalkylated polyols, polyoxalkylated mercaptans and aliphatic amines, polyoxalkylated alkylphenols and alkylnaphthols, polyoxalkylated alkylarylmercaptans and alkylarylamines.

b. Fatty acid esters of ethylene glycol and of the polyethylene glycols, as well as of propylene and butylene glycol, of glycerine or of the polyglycerines and of pentaerythritol, as well as of sugar alcohols, for example, sorbitol, sorbitanes and sucrose.

c. N-Hydroxyalkyl-carbonamides, polyoxalkylated carboxylic acid amides and sulphonamides.

d. Liquid polyalkylene glycols, especially polyethylene glycols.

By way of example, the following may be mentioned as advantageously usable dispersing agents from this group: addition products of 8 mols of ethylene oxide to 1 mol of p-tert. octylphenol, of 15 or 6 mols of ethylene oxide to castor oil, of 20 mols of ethylene oxide to the alcohol $C_{16}H_{33}OH$, ethylene oxide addition products to di-($\alpha$-phenylethyl)-phenols, polyethylene oxide-tert.-dodecylthioethers, polyamine, and polyglycol-ethers or addition products of 15 or 30 mols of ethylene oxide to 1 mol of amine $C_{12}H_{25}NH_2$ or $C_{18}H_{37}NH_2$.

Especially valuable dispersing agents are sodium sulphosuccinate, sodium alkylarylsulphonates, aminealkylarylsulphonates, fatty acid esters of sorbitane, ethoxylated alkanolamides, ethoxylated phenols and ethoxylated phosphate esters.

The present preparations must not simultaneously contain (a) dyestuffs in which primary, secondary or tertiary basic nitrogen atoms are present and (b) an amount of an acid which is at least equivalent to the nitrogen atoms.

The manufacture of the dyestuff preparations according to the invention is as a rule effected by simple mixing, in which case the mixture is appropriately stirred, or by grinding the components, for example in a ball mill.

The dyestuff preparations described above are suitable for the manufacture of conventional aqueous dyebaths and above all for the manufacture of dyebaths based on organic solvents, in which the dyestuffs are dispersed or preferably dissolved.

The following Examples illustrate the invention. The parts, unless otherwise indicated, denote parts by weight, and the percentages denote percentages by weight.

EXAMPLE 1

2 Parts of an anthraquinone dyestuff of formula

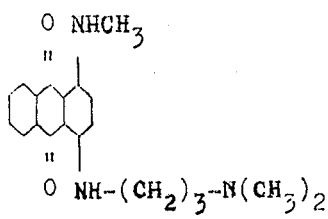

3 parts of hexamethylphosphoric acid triamide and 1 part of an addition product of 5 mols of ethylene oxide to castor oil are finely ground in a ball mill. A dyestuff preparation of low viscosity is obtained, which on addition to a padding liquor consisting of tetrachlorethylene immediately distributes to give a homogeneous solution.

EXAMPLE 2

10 Parts of a fibre-reactive dispersion dyestuff of formula

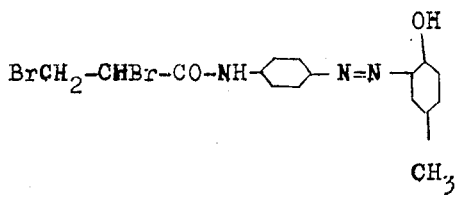

are introduced into a well-stirred mixture of 10 parts of hexamethylphosphoric amide and 2 parts of sorbitane-monolaurate and stirred until a clear solution has been produced, from which no dyestuff crystallises out even on cooling to −10°C.

If the dispersing agent (sorbitane-monolaurate) is omitted, a clear preparation is again obtained.

EXAMPLE 3

20 Parts of the acid wool dyestuff of formula

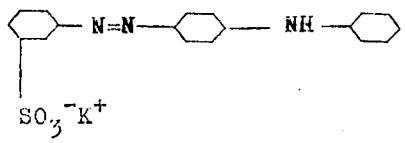

are introduced into 30 parts of hexamethylphosphoric amide whilst stirring. The mixture is stirred for 2 hours at 35° to 40°C, whereupon the dyestuff dissolves. Thereafter it is cooled to 10°C, 10 parts of triethylene glycol monomethyl ether are added and small amounts of salt are filtered off. A clear dyestuff preparation of low viscosity is obtained.

Further dyestuff preparations which are obtained in accordance with the data of Examples 1 to 3 are quoted in the Table which follows.

| | Dyestuff/Parts | Solvent | Dispersing agents |
|---|---|---|---|
| 1 | C.I. Basic Yellow 13 (as the acetate) 20 parts | Hexamethylphosphoric amide 15 parts<br>Ethylene glycol monomethyl ether 15 parts | —<br>— |
| 2 | C.I. Acid Orange 3 (as K salt) 2 parts | Hexamethylphosphoric amide 2 parts<br>Pyridine 1 part | — |
| 3 | C.I. Solvent Yellow 2 1 part | Hexamethylphosphoric amide 1 part<br>Sulpholane 1 part | — |
| 4 | 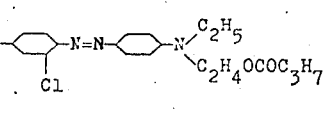 33 parts | Hexamethylphosphoric amide 67 parts | — |
| 5 | 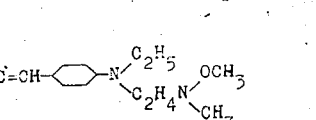 30 parts | Hexamethylphosphoric amide 40 parts | Addition product of 40 mols of ethylene oxide to castor oil 30 parts |
| 6 | C.I. Direct Red 45 3 parts | Hexamethylphosphoric amide 5 parts<br>Diethylene glycol monomethyl ether 3 parts | Triethanolammonium salt of coconut fatty acid 1 part |
| 7 | 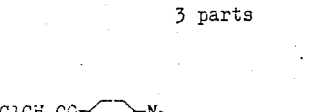 20 parts | Hexamethylphosphoric amide 65 parts | Sodium oleate 15 parts |

— Continued

| | Dyestuff/Parts | Solvent | Dispersing agents |
|---|---|---|---|
| 8 | Hexamethylphosphoric amide 6.2 parts | C.I. Basic Blue 3 3.8 parts | — |
| 9 | 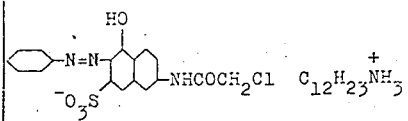 33 parts | Hexamethylphosphoric amide 67 parts | — |
| 10 | C.I. Acid Orange (potassium salt) 2 parts | Hexamethylphosphoric amide 3 parts | Coconut fatty acid ethanolamide 1 part |
| 11 | 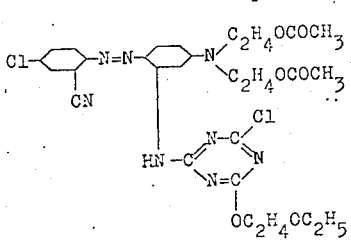 2.3 parts | Hexamethylphosphoric amide 7.7 parts | — |
| 12 | 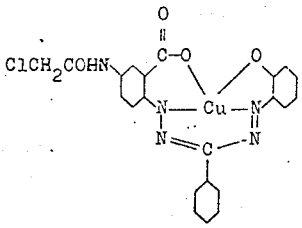 25 parts | Hexamethylphosphoric amide 50 parts | Addition product of 9 mols of ethylene oxide to nonylphenol 25 parts |
| 13 | 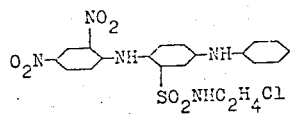 5 parts | Hexamethylphosphoric amide 5 parts Tetrachlorethylene 10 parts | Stearyl alcohol + 20 mols of ethylene oxide 5 parts |
| 14 | 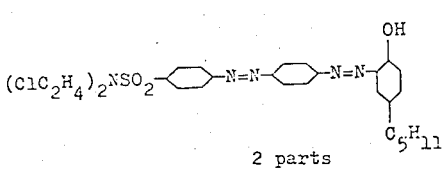 2 parts | Hexamethylphosphoric amide 4 parts | $C_{16}H_{33}O(CH_2CH_2)_{20}OSO_3^-$ $\overset{+}{H N}(C_2H_4OH)_3$ 2 parts |

We claim:

1. A stable dye concentrate consisting essentially of at least one substantially pure dyestuff and hexamethylphosphotriamide, said concentrate containing from about 20 to about 50 percent by weight of dyestuff.

2. The dye concentrate of claim 1, wherein the dyestuff is a metal complex dyestuff free of sulphonic acid groups.

3. The dye concentrate of claim 2, wherein the dyestuff is a disperse dyestuff.

4. The dye concentrate of claim 2, wherein the dyestuff is a dyestuff possessing at least one quaternary nitrogen atom.

5. The dyestuff concentrate of claim 1, wherein the dyestuff is a lacquer-soluble dyestuff or a dyestuff suitable for dyeing cellulose acetate spinning compositions.

6. The dyestuff concentrate of claim 1, wherein the dyestuff is a substantive or acid wool dyestuff containing a sulphonic acid group.

7. The dye concentrate of claim 6, wherein the dyestuff is an acid wool dyestuff having a fiber-reactive group.

8. The dyestuff concentrate of claim 1, which simultaneously contains (a) a water-insoluble disperse dyestuff and (b) a water-soluble acid fiber-reactive dyestuff.

9. The dye concentrate of claim 1, which additionally contains an anionic or non-ionic dispersing agent.

10. The dye concentrate of claim 9, in which up to 50% by weight of the hexamethylphosphotriamide is replaced by the dispersing agent.

11. The dye concentrate of claim 1, to which there has been added from 0.5 to 2 parts by weight of a solvent for the dyestuff per part by weight of hexamethylphosphotriamide.
12. The dye concentrate of claim 1, wherein the dyestuff is a fiber-reactive disperse dyestuff.
13. The dye concentrate of claim 12, wherein the fiber-reactive disperse dyestuff is of the formula
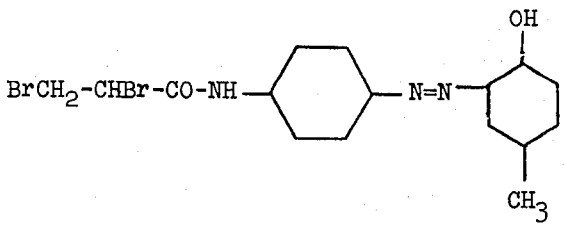
* * * * *